US012252100B2

(12) United States Patent
Beitelschmidt et al.

(10) Patent No.: US 12,252,100 B2
(45) Date of Patent: Mar. 18, 2025

(54) DEVICE FOR A SCREEN WIPING SYSTEM OF A MOTOR VEHICLE

(71) Applicant: Bayerische Motoren Werke Aktiengesellschaft, Munich (DE)

(72) Inventors: Maximilian Beitelschmidt, Weyarn (DE); Michael Herzinger, Pfaffenhofen an der Glonn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/283,530

(22) PCT Filed: Aug. 31, 2022

(86) PCT No.: PCT/EP2022/074169
§ 371 (c)(1),
(2) Date: Sep. 22, 2023

(87) PCT Pub. No.: WO2023/031251
PCT Pub. Date: Mar. 9, 2023

(65) Prior Publication Data
US 2024/0109516 A1  Apr. 4, 2024

(30) Foreign Application Priority Data
Sep. 2, 2021 (DE) .................. 10 2021 122 692.9

(51) Int. Cl.
*B60S 1/40* (2006.01)
*B60S 1/38* (2006.01)
(52) U.S. Cl.
CPC .......... *B60S 1/4048* (2013.01); *B60S 1/4038* (2013.01); *B60S 1/4045* (2013.01); *B60S 1/3868* (2013.01); *B60S 2001/4051* (2013.01)

(58) Field of Classification Search
CPC ........ B60S 1/40; B60S 1/4045; B60S 1/3868; B60S 1/4048; B60S 1/4064; B60S 1/4038;
(Continued)

(56) References Cited

U.S. PATENT DOCUMENTS 4,083,642 A * 4/1978 Journee ................ B60S 1/4074
15/250.32
2014/0259507 A1 * 9/2014 Caillot .................. B60S 1/3858
15/250.32
(Continued)

FOREIGN PATENT DOCUMENTS

CA         2 898 928 A1    1/2017
DE  10 2010 052 314 A1    5/2012
(Continued)

OTHER PUBLICATIONS

Machine translation of description portion of French publication 2781741, published Feb. 2000. (Year: 2000).*
(Continued)

*Primary Examiner* — Gary K. Graham
(74) *Attorney, Agent, or Firm* — Crowell & Moring LLP

(57) ABSTRACT

An apparatus for connecting a wiper blade to a wiper arm for a screen wiping system of a motor vehicle is provided. The apparatus includes an adapter that is connectable to the wiper blade; a receiving element that is connectable to the wiper arm and has an adapter opening for receiving the adapter. The adapter has at least two locking regions which can be deformed with respect to one another and are configured to lock the adapter to the receiving element in a locking position. The apparatus also includes an actuator for unlocking the locking regions, wherein, in an unlocking position, the actuator engages into an engagement opening of the receiving element and, in the process, the two locking regions are deformed with respect to one another by the (Continued)

actuator in such a way that the adapter can be removed through the adapter opening.

19 Claims, 2 Drawing Sheets

(58) Field of Classification Search
CPC ............ B60S 1/4003; B60S 2001/4051; B60S 2001/4054; B60S 2001/4058
USPC ...................................................... 15/205.32
See application file for complete search history.

(56) References Cited

U.S. PATENT DOCUMENTS

| | | |
|---|---|---|
| 2015/0013095 A1 | 1/2015 | Caillot |
| 2018/0162326 A1 | 6/2018 | Gaucher et al. |
| 2019/0031151 A1 | 1/2019 | Moneyron et al. |

FOREIGN PATENT DOCUMENTS

| | | | |
|---|---|---|---|
| DE | 11 2015 003 232 T5 | 5/2017 | |
| FR | 2781741 A1 * | 2/2000 | ............ B60S 1/3801 |
| FR | 3 091 237 A1 | 7/2020 | |

OTHER PUBLICATIONS

International Search Report (PCT/ISA/210) issued in PCT Application No. PCT/EP2022/074169 dated Dec. 5, 2022 with English translation (5 pages).
German-language Written Opinion (PCT/ISA/237) issued in PCT Application No. PCT/EP2022/074169 dated Dec. 5, 2022 with English translation (7 pages).
German-language Search Report issued in German Application No. 10 2021 122 692.9 dated Jul. 25, 2022 with partial English translation (11 pages).

* cited by examiner

DEVICE FOR A SCREEN WIPING SYSTEM OF A MOTOR VEHICLE

FIELD OF THE INVENTION

The invention relates to an apparatus for connecting a wiper blade to a wiper arm for a screen wiping system of a motor vehicle.

BACKGROUND AND SUMMARY OF THE INVENTION

A conventional screen wiping system for a motor vehicle typically comprises a wiper arm which is fastened to the motor vehicle. A replaceable wiper blade is in turn fastened to this wiper arm by means of an adapter. In known embodiments, the wiper blade and the adapter can form an assembly. To this end, the wiper blade is connected to the adapter, and the adapter can be fastened releasably to the wiper arm in an adapter receptacle.

One known fastening means for a standard wiper system of this type is a top-lock locking means. In the case of this locking type, the adapter receptacle is also frequently called a "slide". Here, the adapter of the wiper blade has a pushbutton on an upper side which points away from the window pane, in order to unlock the wiper blade, fastened by means of the adapter, from the wiper arm.

In addition, in recent years, the wiper arms have been developed further as wet arm systems for direct wet cleaning of the window pane; here, for example, a hose for feeding a cleaning liquid and integrated washing nozzles are situated in the wiper arm.

For functional reasons, however, these washing nozzles and also the hose are preferably concealed by way of a concealing cap. This concealing cap extends here over the complete wiper arm, which would prevent the access to a top-lock unlocking button. In addition, the concealing cap is fastened via a latching means to the lower side, pointing toward the window pane, of the adapter receptacle, which makes the usability when changing the wiper blade considerably more difficult. For this reason, different concepts are necessary for unlocking the wiper blade in the case of wet arm wiping systems.

For the above-described standard wiper systems without a wet arm, US 2019/0031151 A1 has disclosed a locking means between the wiper arm and the wiper blade by means of an adapter, the locking means having an elastic locking arm, arranged outside the adapter receptacle, with a pushbutton. The elastic locking arm as locking and unlocking means has the disadvantage, however, of fracturing rapidly in the case of excessive loading. In addition, the locking and unlocking means have a high number of constituent parts which cause higher costs and more complicated operation.

A similar locking mechanism for the standard wiper systems is also known from FR 3 091 237 A1.

A very wide variety of locking mechanisms are known for wet arm wiper systems from US 2015/0013095 A1. Inter alia, FIG. 1 of US 2015/0013095 A1 presents different embodiments with hooks, arms with lateral pins, arms with pushbuttons/slides, and arms with clamping lugs. These locking mechanisms would prevent the use of the preferred concealing cap, however, since the concealing cap is intended to extend over the complete wiper arm as described above. In addition, the locking and unlocking means suffer from the problem of relying on hooks, pins, arms and clamping lugs consisting of small parts which complicate the usability and fracture easily in the case of overloading. Here too, the locking and unlocking means have a high number of constituent parts which cause higher costs and more complicated operation.

A locking means by means of a slide is likewise known for a wet arm wiper system from DE 10 2010 052 314 A1. This slide would also prevent the use of the preferred concealing cap. In addition, the provided introduction of latch nipples into corresponding recesses complicates their usability, since they are concealed by the slide and are therefore not visible to the user. A high number of constituent parts of the locking and unlocking means which cause higher costs and more complicated operation are likewise required.

In summary, in the case of known apparatuses for connecting a wiper blade to a wiper arm, the locking and unlocking means can fracture easily in the case of overloading, and the operation is complicated as a result of the use of locking and unlocking means consisting of small parts. The high number of constituent parts of the known locking and unlocking means is also associated here with increased production and manufacturing costs. In addition, the known apparatuses are not suitable for use both in a standard wiper system without a wet arm and in a wet arm system with a concealing cap.

The present invention is therefore based on the object of providing an inexpensive and reliable apparatus for connecting a wiper blade to a wiper arm for a screen wiping system of a motor vehicle, which apparatus permits simple operation and prevents breaking off of the locking and unlocking means in the case of overloading.

According to the invention, the object is achieved by way of the features of the independent claims. Advantageous developments of the invention result from the subclaims.

According to the invention, this object is achieved by way of an apparatus for connecting a wiper blade to a wiper arm for a screen wiping system of a motor vehicle, comprising an adapter which is of connectable configuration to the wiper blade; a receiving element which is of connectable configuration to the wiper arm and has an adapter opening for receiving the adapter; the adapter having at least two locking regions which can be deformed with respect to one another and are configured to lock the adapter to the receiving element in a locked position; and an actuating means for unlocking the locking regions, the actuating means engaging into an engagement opening of the receiving element in an unlocked position, and the two locking regions being deformed in the process by way of the actuating means with respect to one another in such a way that the adapter can be removed through the adapter opening.

As a result of the engagement of the actuating means into the engagement opening, the two locking regions which can be deformed with respect to one another can be deformed with respect to one another at the same time with only one actuation of a user, which considerably simplifies the operation. In addition, the force which is required for locking and unlocking is divided between at least two locking regions, as a result of which the load-bearing capability of the apparatus overall is increased. Moreover, in the apparatus according to the invention, the adapter is latched to the adapter receptacle at least twice via the locking regions, which considerably improves the safety of the locking means. Since the apparatus also has only a few constituent parts, it can additionally be produced inexpensively.

In one particularly preferred embodiment, it is possible for the actuating means to be actuated along an actuating direction, and a spacing between the two locking regions which is orthogonal with respect to an actuating direction is greater in the locked position than in the unlocked position. Therefore, the spacing between the two locking regions can be decreased in a simple way with only one movement of the actuating means along the actuating direction. Here, this spacing is decreased in such a way that the adapter can be removed through the adapter opening.

In a further particularly preferred embodiment, the engagement opening is arranged on an end side of the apparatus according to the invention. This arrangement makes the use both in a standard wiper system without a wet arm and a wet arm system with a concealing cap possible. As a result of this end-side arrangement of the engagement opening, the concealing cap can extend, beginning at the engagement opening, over the remaining wiper arm. Regions can be concealed here which should not be concealed in the case of a known top-lock locking means. The apparatus is preferably of elongate configuration in this embodiment. Here, the engagement opening is further preferably arranged opposite a connecting side of the receiving element, the receiving element being connected to the wiper arm on the connecting side.

In one embodiment, at least one of the locking regions has a wedge-shaped cross section. As a result, the apparatus is particularly satisfactorily durable with respect to forces which act during the actuation. An acutely tapering end of the locking region is connected here to the actuating means, and the wedge geometry increases the fracture resistance of the locking region.

In a further embodiment, the adapter opening corresponds to the engagement opening. Since only one opening is required, both the production and the operation of the apparatus are further simplified.

In one preferred embodiment, the locking regions each have a latching lug, and the latching lug engaging into a latching opening of the receiving element in the locked position. A reliable and satisfactorily releasable connection is ensured between the adapter and the receiving element by way of the latching of a locking region to the latching opening of the receiving element.

In one particularly preferred embodiment, the actuating means has a pushbutton, and at least two unlocking regions are each arranged with a run-on contour on the pushbutton, which unlocking regions are suitable for deforming the locking regions with respect to one another in the unlocked position. The run-on contour is configured here in such a way that the locking regions are deformed with respect to one another by way of an actuation or movement of the pushbutton. Particularly efficient unlocking is therefore ensured.

In a further embodiment, the locking regions each have an end piece. Here, the run-on contour bears against the end piece in the case of the engagement of the actuating means into the engagement opening. The contact makes a particularly simple type of force transmission from the actuating means to the locking regions possible, in order to deform the latter with respect to one another.

Here, the run-on contour is particularly preferably configured in such a way that, in the case of a displacement of the actuating means along the actuating direction toward the unlocked position, the end piece carries out a movement along the run-on contour. The locking regions can therefore be deformed with respect to one another particularly simply for the unlocked position.

In a further embodiment, the actuating means are configured in such a way that, in the case of the engagement into the engagement opening, the run-on contour is inclined at least in one part region with respect to the actuating direction. As a result, the respective end piece can be displaced along the corresponding run-on contour, as a result of which the locking regions are deformed with respect to one another and toward the actuating direction. As a result, a satisfactorily controllable deformation of the locking regions is ensured.

Here, the receiving element can be connected in one piece to the wiper arm in all the embodiments of the present invention. An inexpensive screen wiping system can be provided as a result of the single-piece configuration or connection. As an alternative, the receiving element and the wiper arm can be configured in two pieces. They are then preferably connected releasably to one another. The modular construction then simplifies the use of the apparatus according to the invention for different wiper arms.

The object mentioned further above is likewise achieved by way of a motor vehicle which has at least one of the apparatuses disclosed above. The stated advantages apply appropriately.

Embodiments of the invention will be described in the following text on the basis of the figures, in which:

DETAILED DESCRIPTION OF THE DRAWINGS

Figure 1:
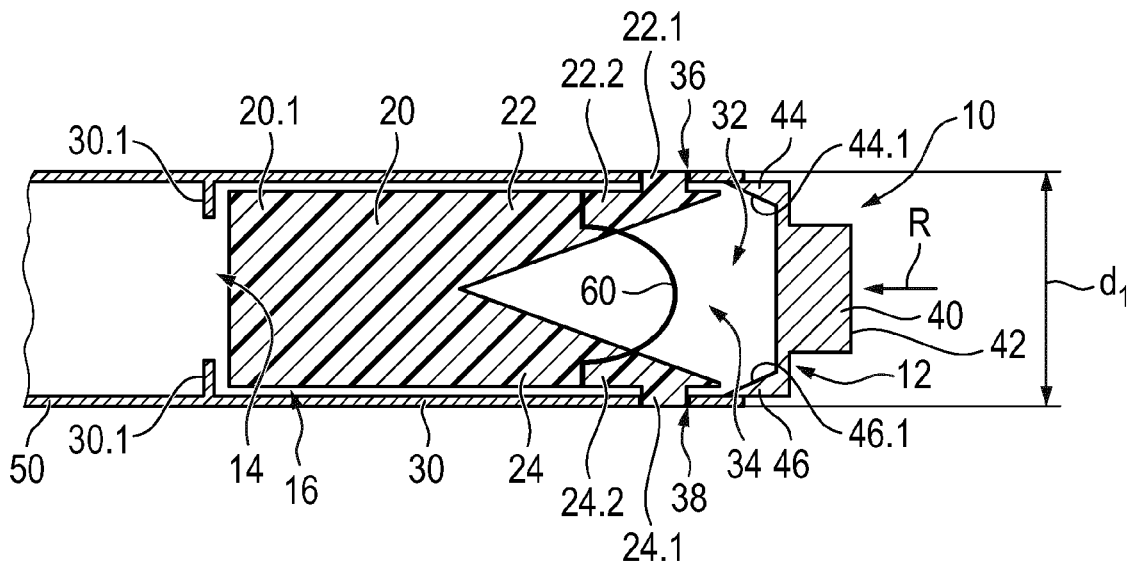
FIG. 1 shows a diagrammatic sectional view of one embodiment of an apparatus according to the invention in a locked position.

FIG. 1 shows an apparatus 10 according to the invention for connecting a wiper blade to a wiper arm 50 for a screen wiping system of a motor vehicle. Here, the apparatus 10 comprises an adapter 20, a receiving element 30 and an actuating means 40. Here, FIG. 1 shows a locked position of the apparatus 10, in which the adapter 20 is locked to the receiving element 30. A wiper blade for screen cleaning can be fastened to the adapter 20, which is not shown in FIG. 1 for reasons of simplification.

As is shown diagrammatically in FIG. 1, the receiving element 30 can be connected to the wiper arm 50 in such a way that it is configured in one piece with the wiper arm 50. The receiving element 30 thus forms a constituent part of the wiper arm 50. It is also conceivable, however, that the receiving element 30 and the wiper arm 50 are configured in two parts. In this case, they are preferably connected releasably to one another. The wiper arm 50 is fastened at one end to the motor vehicle, and is driven by way of a known driving means in a wiping movement for screen cleaning (not shown).

The receiving element 30 preferably has a stop 30.1 for limiting the movement of the adapter 20 in the receiving element 30, in order that a user can find the correct locked position of the adapter 20 in the receiving element 30 more simply.

As can be seen in FIG. 1, the receiving element 30 is preferably of hollow formation and is configured to receive the adapter 20. Here, the adapter 20 can be pushed through an adapter opening 32 into the receiving element 30. FIG. 1 shows one embodiment, in the case of which the adapter opening 32 is arranged on an end side 12 of the apparatus 10 which is, for example, of elongate configuration. The end side 12 is preferably situated opposite a wiper arm side 14, on which the receiving element 30 of the apparatus 10 is connected to the wiper arm 50.

It is also conceivable in another embodiment that the adapter opening 32 is arranged on a lower side 16 of the apparatus 10, the lower side 16 pointing toward the vehicle screen of a motor vehicle when the apparatus 10 is installed on the vehicle. For introduction or removal of the adapter 20, the wiper arm 50 then has to be lifted up from the window pane.

It is of particular importance in relation to the adapter 20 that the two locking regions 22 and 24 can be deformed with respect to one another under the action of force. The locking regions 22 and 24 preferably lie opposite one another, which facilitates this type of deformation. The locking regions 22 and 24 can preferably be deformed elastically in all the embodiments.

Furthermore, it can be seen in FIG. 1 that the adapter 20 has at least a first locking region 22 with a first latching lug 22.1 and a first end piece 22.2 and, moreover, a second locking region 24 with a second latching lug 24.1 and a second end piece 24.2. Here, the end pieces 22.2 and 24.2 point toward the end side 12 of the apparatus 10. In the locked position which is shown in FIG. 1, the first latching lug 22.1 engages into a first latching opening 36. Correspondingly, the second latching lug 24.1 engages into a second latching opening 38. The adapter 20 is locked to the receiving element 30 at least by way of these latching means. It is conceivable here that there are additional locking regions which, as described, are latched to the receiving element 30.

In the locked position which is shown in FIG. 1, the two locking regions 22 and 24 are not deformed with respect to one another and are at a locking spacing $d_1$ from one another. Here, the locking spacing $d_1$ runs between the two locking regions 22 and 24 orthogonally with respect to an actuating direction R of the actuating means 40.

In addition, it can be seen in FIG. 1 that the locking regions 22 and 24 have a wedge-shaped cross section, the base of the wedge shape being arranged on an adapter main body 20.1, and the wedge shape tapering toward the end pieces 22.2 and 24.2. This makes a particularly durable deformation of the locking regions 22 and 24 with respect to one another possible.

The adapter 20 is preferably configured in one piece. It is also conceivable, however, that the stated elements of the adapter consist of individual constituent parts and are assembled.

In all the embodiments, in addition, the adapter 20 can be configured in such a way that the locking regions 22 and 24 are connected circumferentially to one another at the end pieces 22.2 and 24.2, with the result that the locking region 22 and 24 is defined by way of its latching lug 22.1 and 24.1, respectively. If viewed along an unlocking direction R in FIG. 1, this would result in a peripheral bounding line (not shown). It is also conceivable, however, that the locking regions 22 and 24 are separated from one another by means of cutouts in the adapter 20.

In order to unlock the adapter 20, the receiving element 30 has an engagement opening 34. The latter is preferably arranged on the end side 12 of the receiving element 30. The engagement opening 34 is designed in such a way that, in the locked position, the actuating means 40 engages into the receiving element 30 in a first actuating position, as shown in FIG. 1. In the first actuating position, the actuating means is situated in the engagement with the receiving element 30, and the locking regions 22 and 24 are not yet deformed with respect to one another by way of the actuating means 40. In the first actuating position, for example, the actuating means 40 can be latched releasably to the receiving element 30.

As can be seen in FIG. 1, the actuating means 40 has, as a base element, a pushbutton 42, on which a first unlocking region 44 with a first run-on contour 44.1 and a second unlocking region 46 with a second run-on contour 46.1 are arranged.

Figure 2:
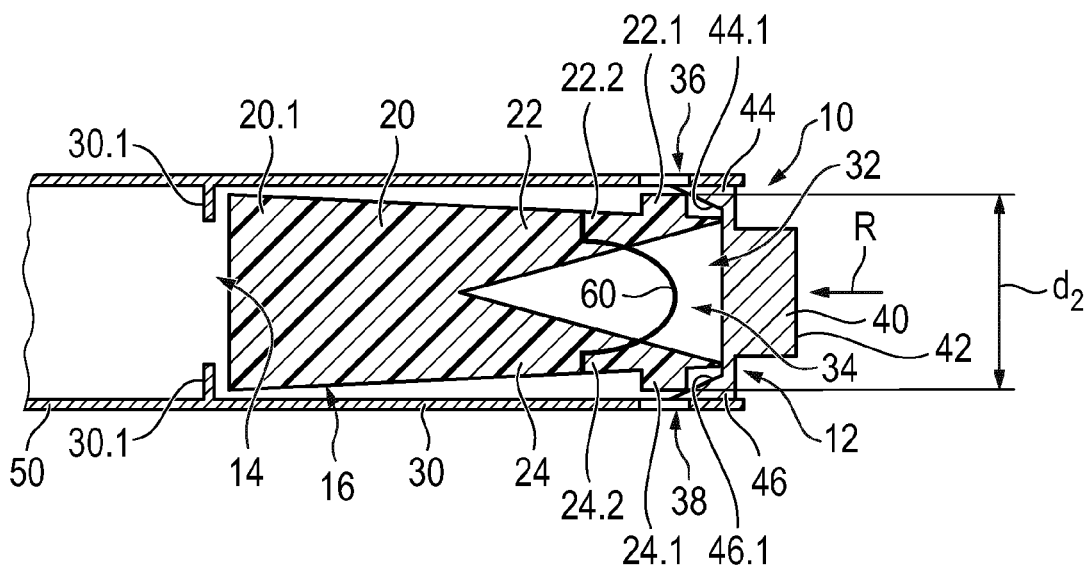
FIG. 2 shows a diagrammatic sectional view of one embodiment of an apparatus according to the invention in an unlocked position.

FIG. 2 shows an unlocked position of the apparatus 10. To this end, the actuating means 40 is moved further along the actuating direction R into the receiving element 30. In the unlocked position, the actuating means 40 engages with the unlocking regions 44 and 46, as shown in FIG. 2, into the engagement opening 34 of the receiving element 30 in a second actuating position. In this second actuating position of the actuating means 40, in which the unlocked position is reached, the locking regions 22 and 24 are deformed with respect to one another by way of the actuating means 40.

As can be seen in FIG. 1, the run-on contour 44.1 already bears against the corresponding end piece 22.2 before the second actuating position is reached; the run-on contour 46.1 likewise bears against the corresponding end piece 24.2. As a result of the displacement of the actuating means 40 from the first actuating position toward the second actuating position along the actuating direction R, the end piece 22.2 carries out a movement along the run-on contour 44.1. In an analogous manner, the end piece 24.2 carries out a movement along the run-on contour 46.1. Therefore, the locking regions 22 and 24 are deformed with respect to one another at the same time and only by way of a single displacement of the actuating means 40.

The actuating means 40 is preferably configured in such a way that, in the case of the engagement into the engagement opening 34, the run-on contours 44.1 and 46.1 are inclined at least in a part region with respect to the actuating direction R. This simplifies the deformation and makes a previously defined deformation of the locking regions 22 and 24 with respect to one another possible.

As can be seen in FIG. 2, it is also conceivable that, in the second actuating position or in the unlocked position, the end pieces 22.2 and 24.2 bear against a different part region than the inclined part region of the respective run-on contour 44.1 and 46.1, respectively. Here, for example, the end pieces 22.2 and 24.2 can be connected releasably to the actuating means 40. A latching means is conceivable for this purpose. In this other part region, the run-on contours 44.1 and 46.1 can be oriented, for example, orthogonally with respect to the actuating direction.

It is also conceivable here that, in the unlocked position, the latching lugs 22.1 and 24.1 bear against the inclined part region of the run-on contour 44.1 and 46.1, respectively. As a result, the deformation of the two locking regions 22 and 24 with respect to one another can be secured in an improved manner in the unlocked position.

Since the two locking regions 22 and 24 are deformed with respect to one another in the unlocked position, they are at an unlocking spacing $d_2$ from one another which is smaller than the locking spacing $d_1$. Here, the unlocking spacing $d_2$ runs between the two locking regions 22 and 24 orthogonally with respect to the actuating direction R of the actuating means 40.

This brings it about firstly that, in the unlocked position, the two latching lugs 22.1 and 24.1 are released from the respective latching openings 36 and 38. Secondly, the adapter 20 is deformed in the unlocked position in such a way that the adapter 20 can be removed from the receiving element 30.

Figure 3:
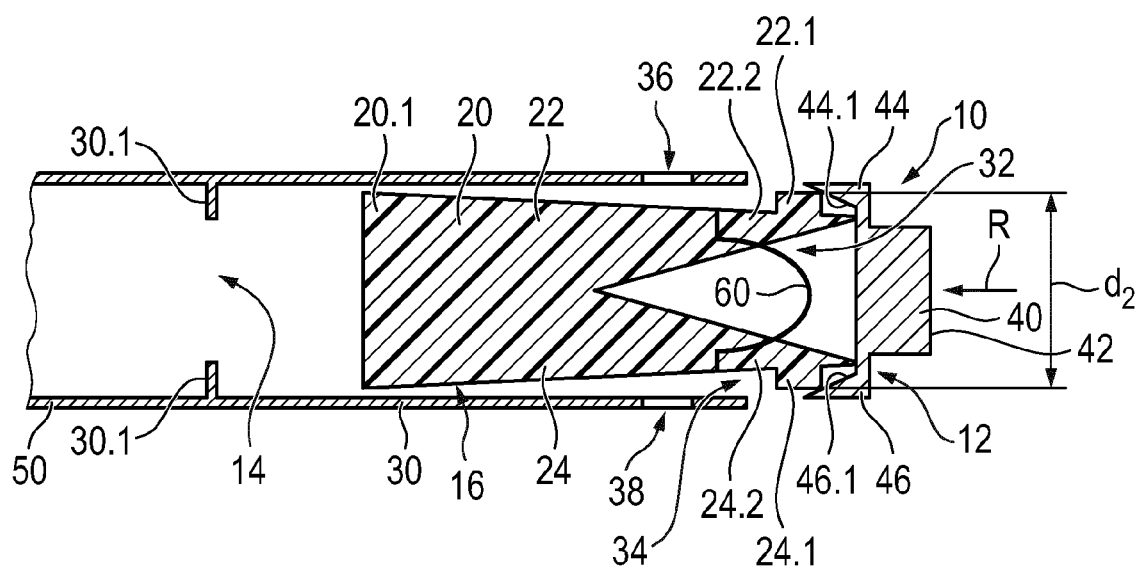
FIG. 3 shows a diagrammatic sectional view of one embodiment of an apparatus according to the invention in an unlocked position similarly to FIG. 2.

This removal is shown by way of example in FIG. 3. In one embodiment which is shown in FIG. 3, the adapter opening 32 corresponds to the engagement opening 34. Here, the unlocking spacing $d_2$ is selected in such a way that, in its unlocked position, the adapter 20 can be removed through the adapter opening 32 or engagement opening 34 on the end side 12 of the apparatus 10. Here, the actuating means 40 remains in its second actuating position, in which the locking regions 22 and 24 are deformed with respect to one another.

Conversely, it is also conceivable that, in the unlocked position, the adapter 20 can be pushed through the adapter opening 32 into the receiving element 30 for mounting purposes. Here, the adapter 20 is preferably pushed with the actuating means 40 in its second actuating position. It is also conceivable, however, that the adapter 20 is pushed in the locked position into the receiving element 30, and the locking regions 22 and 24 are only deformed with respect to one another by way of the adapter opening 32, in order that the adapter 20 can be received completely into the receiving element 30.

It is also conceivable, however, that the adapter opening 32 is different than the engagement opening 34 if, for example, the adapter opening 32 is arranged on the lower side 16 of the apparatus 10 and the engagement opening is arranged on the end side 12 of the apparatus 10. In this case, the adapter 20 can be removed in its unlocked position through the adapter opening 32 on the lower side 16 of the apparatus 10.

In all the embodiments, a spring element 60 can fundamentally optionally be provided in the apparatus 10, in order to bring about a restoring force between the locking regions 22 and 24. As is shown in FIGS. 1 to 3, the optional spring element is preferably arranged between the locking regions 22 and 24. The restoring force can serve firstly to increase the magnitude of the latching action between the latching lugs 20 and the receiving element 30, as a result of which the adapter 20 is secured in the receiving element 30 in an improved manner. Secondly, the locking regions 22 and 24 can be reliably transferred back into the locked position if they were previously deformed into the unlocked position with respect to one another as described above.

The adapter 10, the receiving element 30, the actuating means 40 and the optional spring element 60 are preferably formed from plastics and/or metals which make the above-described latching actions, deformations and/or spring actions possible.

LIST OF DESIGNATIONS

10 Apparatus
12 End side
14 Wiper arm side
16 Lower side
20 Adapter
20.1 Adapter main body
22 First locking region
22.1 First latching lug
22.2 First end piece
24 Second locking region
24.1 Second latching lug
24.2 Second end piece
30 Receiving element
30.1 Stop
32 Adapter opening
34 Engagement opening
36 First latching opening
38 Second latching opening
40 Actuating means
42 Pushbutton
44 First unlocking region
44.1 First run-on contour
46 Second unlocking region
46.1 Second run-on contour
50 Wiper arm
60 Spring element
R Actuating direction
$d_1$ Locking spacing
$d_2$ Unlocking spacing

The invention claimed is:

1. An apparatus for connecting a wiper blade to a wiper arm for a screen wiping system of a motor vehicle, the apparatus comprising:
   an adapter that is connectable to the wiper blade;
   a receiving element that is connectable to the wiper arm and has an adapter opening for receiving the adapter the receiving element is elongated to define a longitudinal direction thereof;
   the adapter having at least two locking regions that are deformable with respect to one another and are configured to lock the adapter to the receiving element in a locked position; and
   an actuator for unlocking the at least two locking regions, the actuator configured to engage into an engagement opening of the receiving element in an unlocked position, and the at least two locking regions being deformed by the actuator with respect to one another in such a way that the adapter is removable through the adapter opening;
   wherein the actuator is actuatable along an actuating direction that coincides with the longitudinal direction of the receiving element.

2. The apparatus according to claim 1, wherein a spacing between the at least two locking regions which is orthogonal with respect to the actuating direction is greater in the locked position than in the unlocked position.

3. The apparatus according to claim 2, wherein the engagement opening is arranged on an end side of the apparatus.

4. The apparatus according to claim 2, wherein at least one of the at least two locking regions has a wedge-shaped cross section.

5. The apparatus according to claim 2, wherein the adapter opening corresponds to the engagement opening.

6. The apparatus according to claim 2, wherein each of the at least two locking regions has a latching lug configured to engage into a latching opening of the receiving element in the locked position.

7. The apparatus according to claim 2, wherein the actuator has a pushbutton, and at least two unlocking regions each being arranged with a run-on contour on the pushbutton, which unlocking regions are suitable for deforming the at least two locking regions with respect to one another in the unlocked position.

8. The apparatus according to claim 1, wherein the engagement opening is arranged on an end side of the apparatus.

9. The apparatus according to claim 8, wherein at least one of the at least two locking regions has a wedge-shaped cross section.

10. The apparatus according to claim 8, wherein the adapter opening corresponds to the engagement opening.

11. The apparatus according to claim 8, wherein each of the at least two locking regions has a latching lug configured to engage into a latching opening of the receiving element in the locked position.

12. The apparatus according to claim 1, wherein at least one of the at least two locking regions has a wedge-shaped cross section.

13. The apparatus according to claim 1, wherein the adapter opening corresponds to the engagement opening.

14. The apparatus according to claim 1, wherein each of the at least two locking regions has a latching lug configured to engage into a latching opening of the receiving element in the locked position.

15. The apparatus according to claim 1, wherein the actuator has a pushbutton, and at least two unlocking regions each being arranged with a run-on contour on the pushbutton, which unlocking regions are suitable for deforming the at least two locking regions with respect to one another in the unlocked position.

16. The apparatus according to claim 15, wherein each of the at least two locking regions has an end piece, and each run-on contour bearing against a respective end piece in the case of the engagement of the actuator into the engagement opening.

17. The apparatus according to claim 16, wherein the each run-on contour is configured in such a way that, in the case of a displacement of the actuator along the actuating direction toward the unlocked position, the respective end piece carries out a movement along the each run-on contour.

18. The apparatus according to claim 17, wherein the actuator is configured in such a way that, in the case of the engagement into the engagement opening, the each run-on contour is inclined at least in one part region with respect to the actuating direction.

19. A motor vehicle, comprising at least one apparatus according to claim 12.

* * * * *